US012568056B2

(12) United States Patent
Xiao

(10) Patent No.: US 12,568,056 B2
(45) Date of Patent: Mar. 3, 2026

(54) METHOD FOR PROCESSING INTERFACE DATA, SENDER DEVICE AND RECEIVER DEVICE

(71) Applicant: SANECHIPS TECHNOLOGY CO., LTD., Shenzhen (CN)

(72) Inventor: Lu Xiao, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 361 days.

(21) Appl. No.: 18/023,937

(22) PCT Filed: Aug. 16, 2021

(86) PCT No.: PCT/CN2021/112764
§ 371 (c)(1),
(2) Date: Feb. 28, 2023

(87) PCT Pub. No.: WO2022/042351
PCT Pub. Date: Mar. 3, 2022

(65) Prior Publication Data
US 2023/0328007 A1 Oct. 12, 2023

(30) Foreign Application Priority Data
Aug. 28, 2020 (CN) .......................... 202010886080.0

(51) Int. Cl.
*H04L 49/9047* (2022.01)
*H04L 49/9057* (2022.01)
*H04L 69/08* (2022.01)
(52) U.S. Cl.
CPC ...... *H04L 49/9052* (2013.01); *H04L 49/9057* (2013.01); *H04L 69/08* (2013.01)

(58) Field of Classification Search
CPC . H04L 49/9052; H04L 49/9057; H04L 69/08; H04W 28/06; H04W 88/085; H04W 24/02; H04W 28/0263; Y02D 30/70
See application file for complete search history.

(56) References Cited

U.S. PATENT DOCUMENTS 6,470,042 B1 * 10/2002 Tani ........................ H04J 13/00
375/E1.034
10,594,423 B1 3/2020 Anand et al.
(Continued)

FOREIGN PATENT DOCUMENTS

CN 102377631 A * 3/2012 ............. H04L 47/10
CN 110049512 A 7/2019
(Continued)

OTHER PUBLICATIONS

Valcarenghi et al., "Time-Versus Size-Based CPRI in Ethernet Encapsulation for Next Generation Reconfigurable Fronthaul", J. Opt. Commun. Netw., vol. 9, No. 9, pp. D64-D73, 2017 (Year: 2017).*

(Continued)

*Primary Examiner* — Shah M Rahman
(74) *Attorney, Agent, or Firm* — Li & Cai Intellectual Property (USA) Office

(57) ABSTRACT
The present disclosure provides an interface data processing method, a transmitting-end device and a receiving-end device. The method includes: mapping data to be processed into interface data based on a data type of the data to be processed, a data type which a receiving-end device can process and preset block description information; and sending the interface data to the receiving-end device.

16 Claims, 6 Drawing Sheets

(56)             References Cited

U.S. PATENT DOCUMENTS

| 2005/0114572 A1* | 5/2005 | Cheung | H04L 69/08 |
| | | | 710/62 |
| 2005/0135291 A1* | 6/2005 | Ketchum | H04L 9/40 |
| | | | 370/337 |
| 2009/0323646 A1* | 12/2009 | Ketchum | H04W 28/065 |
| | | | 370/338 |
| 2012/0054364 A1* | 3/2012 | Andries | H04L 65/752 |
| | | | 709/235 |
| 2015/0193271 A1* | 7/2015 | Archer | G06F 9/4843 |
| | | | 718/101 |
| 2017/0063586 A1* | 3/2017 | Sun | H04B 7/0874 |
| 2020/0236592 A1 | 7/2020 | Berg et al. | |
| 2020/0252889 A1 | 8/2020 | Anand et al. | |
| 2020/0337113 A1* | 10/2020 | Na | H04W 80/02 |
| 2020/0404675 A1* | 12/2020 | Ou | H04W 72/54 |

| 2021/0007011 A1* | 1/2021 | Zhu | H04B 7/15542 |
| 2021/0065480 A1* | 3/2021 | Liu | H04L 67/565 |
| 2023/0309173 A1* | 9/2023 | Kim | H04W 80/08 |

FOREIGN PATENT DOCUMENTS

| CN | 111163022 A | | 5/2020 | |
| CN | 111212446 A | * | 5/2020 | H04L 1/0023 |
| CN | 111835748 A | | 10/2020 | |
| WO | 2018103083 A1 | | 6/2018 | |
| WO | WO2019083097 A1 | | 5/2019 | |

OTHER PUBLICATIONS

European Patent Office, extended European Search Report dated Aug. 16, 2024, for corresponding EP application No. 21860189.6.
WIPO, International Search Report issued on Nov. 17, 2021.

* cited by examiner

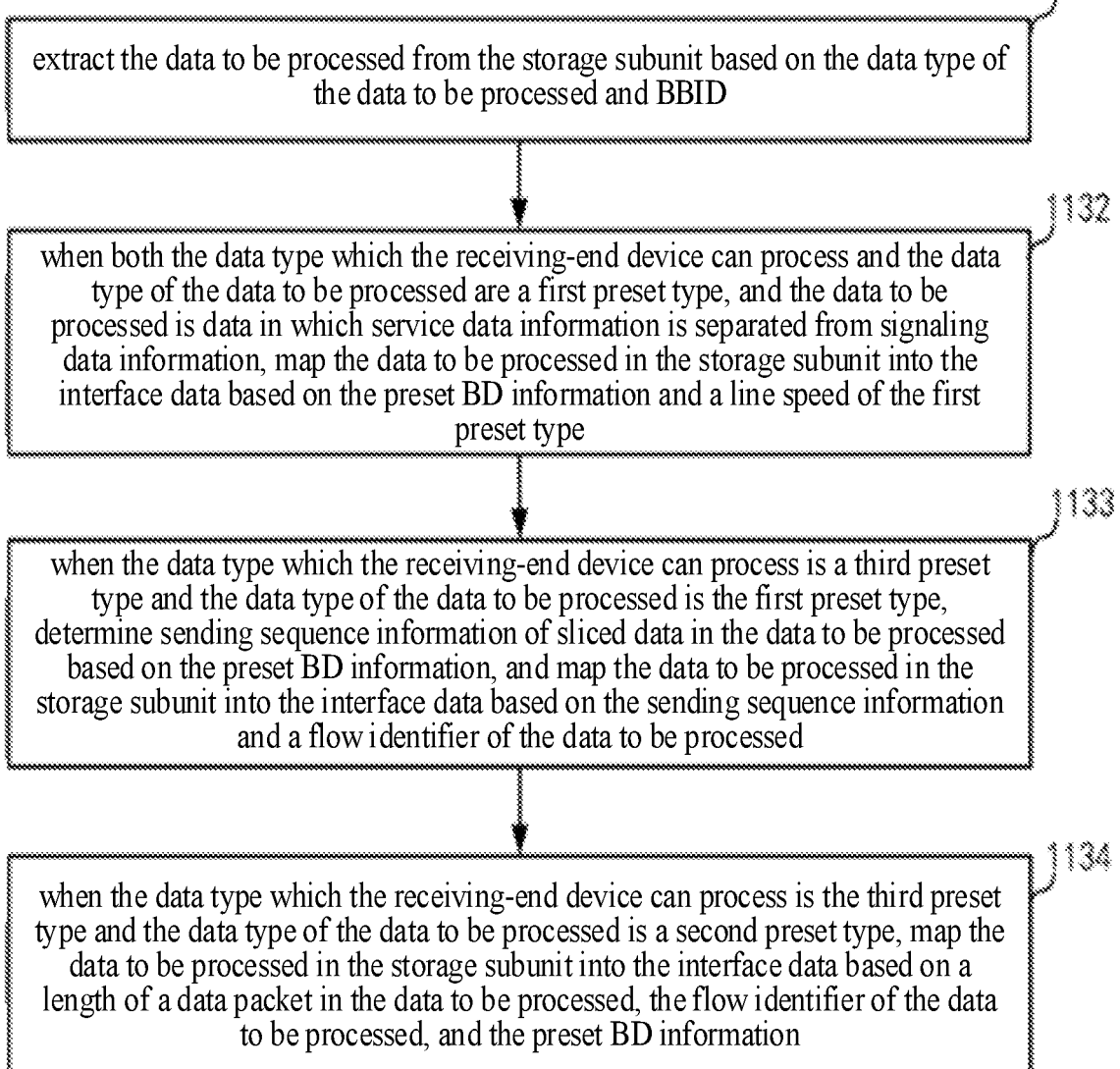

extract the data to be processed from the storage subunit based on the data type of the data to be processed and BBID when both the data type which the receiving-end device can process and the data type of the data to be processed are a first preset type, and the data to be processed is data in which service data information is separated from signaling data information, map the data to be processed in the storage subunit into the interface data based on the preset BD information and a line speed of the first preset type when the data type which the receiving-end device can process is a third preset type and the data type of the data to be processed is the first preset type, determine sending sequence information of sliced data in the data to be processed based on the preset BD information, and map the data to be processed in the storage subunit into the interface data based on the sending sequence information and a flow identifier of the data to be processed when the data type which the receiving-end device can process is the third preset type and the data type of the data to be processed is a second preset type, map the data to be processed in the storage subunit into the interface data based on a length of a data packet in the data to be processed, the flow identifier of the data to be processed, and the preset BD information

FIG. 3

METHOD FOR PROCESSING INTERFACE DATA, SENDER DEVICE AND RECEIVER DEVICE

CROSS-REFERENCE TO RELATED APPLICATIONS

The present disclosure is a National Phase Application filed under 35 U.S.C. 371 as a national stage of PCT/CN2021/112764, filed on Aug. 16, 2021, an application claiming the priority to Chinese Patent Application No. CN202010886080.0 filed on Aug. 28, 2020, the entire contents of which are incorporated herein by reference.

TECHNICAL FIELD

The present disclosure relates to the field of communication technology, and in particular, to an interface data processing method, a transmitting-end device, and a receiving-end device.

BACKGROUND

In networking scenarios of a $5^{th}$ Generation Mobile System (5G), data transmission between network element devices has transmission characteristics of low latency, high bandwidth, and large data volume. All devices in a 5G network adopt an Ethernet fronthaul interface protocol (i.e., a 5G fronthaul interface protocol) for communication, but most of devices in a distributed base station system adopt a conventional fronthaul interface protocol, such as the Common Public Radio Interface (CPRI) protocol, for communication.

When networking and communication between different devices are needed, flexible networking and communication between the different devices cannot be achieved due to the different interface protocols adopted by the devices in the distributed base station system and the new devices in the 5G network, which hinders development of the communication technology.

SUMMARY

Embodiments of the present disclosure provide an interface data processing method, including: mapping data to be processed into interface data based on a data type of the data to be processed, a data type which a receiving-end device can process, and preset Block Description (BD) information; and sending the interface data to the receiving-end device.

The embodiments of the present disclosure provide an interface data processing method, including: extracting BD information from interface data in response to the interface data sent by a transmitting-end device; and demapping the interface data based on the BD information to obtain demapped data.

The embodiments of the present disclosure provide a transmitting-end device, including: a mapping module configured to map data to be processed into interface data based on a data type of the data to be processed, a data type which a receiving-end device can process, and preset BD information, and a sending module configured to send the interface data to the receiving-end device.

The embodiments of the present disclosure provide a receiving-end device, including: an extraction module configured to extract BD information from interface data in response to the interface data sent by a transmitting-end device; and a demapping module configured to demap the interface data based on the BD information to obtain demapped data.

The embodiments of the present disclosure provide a network device, including: one or more processors; and a memory having stored thereon one or more programs which, when executed by the one or more processors, cause the one or more processors to perform any one of the interface data processing methods described herein.

The embodiments of the present disclosure provide a readable storage medium storing a computer program which, when executed by a processor, cause the processor to perform any one of the interface data processing methods described herein.

The above embodiments and other aspects of the present disclosure and implementations thereof are further described in the Brief Description Of Drawings, the Detail Description of Embodiments and the Claims.

BRIEF DESCRIPTION OF DRAWINGS

FIG. 3 is a flowchart illustrating a method of mapping data to be processed in a storage subunit into interface data according to the present disclosure.

DETAIL DESCRIPTION OF EMBODIMENTS

In order to make the objectives, technical solutions and advantages of the present disclosure clearer, the embodiments of the present disclosure are described in detail below in conjunction with the drawings. It should be noted that the embodiments described herein and the features therein can be arbitrarily combined with one another if no conflict is incurred.

With the rapid development of the 5G network, the conventional fronthaul interface protocol gradually evolves into the Ethernet fronthaul interface protocol, for example, the CPRI protocol evolves into any one of the Radio over Ethernet (RoE) Protocol, the Enhanced Common Public Radio Interface (eCPRI) Protocol, and the Radio Access Network (RAN) Protocol. Compared with the conventional CPRI Protocol, the Ethernet fronthaul interface protocol is a protocol for performing encapsulation based on Ethernet messages (e.g., an Internet Protocol (IP) message, and a User Datagram Protocol (UDP) message), and the Ethernet fronthaul interface protocol adopts a method of separating signaling data, control word data, and In-phase Quadrature (IQ) data, thereby supporting more flexible transmission in a 5G networking scenario.

However, the conventional CPRI protocol is often used between a base station and a radio frequency unit in the distributed base station system. Due to the different interface protocols, the devices in the distributed base station system cannot communicate with the devices in the 5G network. For enabling communication between the devices in the distributed base station system and the devices in the 5G network, interface conversion is needed, which increases network delay, prevents flexible networking of different devices, and hinders the development of the communication technology.

An interface data processing method provided by the present disclosure can be applied to processing of interface data between a 4G Building Base band Unit (BBU) and a 4G Remote Radio Unit (RRU), and can also be applied to processing of interface data between a 5G BBU and a 5G RRU and processing of interface data between a fronthaul interface of the 4G RRU and a fronthaul interface of the 5G RRU; that is, the interface data processing method provided by the present disclosure are applicable in scenarios, such as protocol conversion between 4G fronthaul interfaces, protocol conversion between 5G fronthaul interfaces, and protocol conversion between a 4G fronthaul interface and a 5G fronthaul interface. It should be noted that the above description of the application scenarios of the interface data processing method provided by the present disclosure is merely for illustration, the application scenarios of the interface data processing method may be specifically set according to actual situations, and other application scenarios of the interface data processing method are also within the scope of the present disclosure, and will not be described in detail here.

Figure 1:
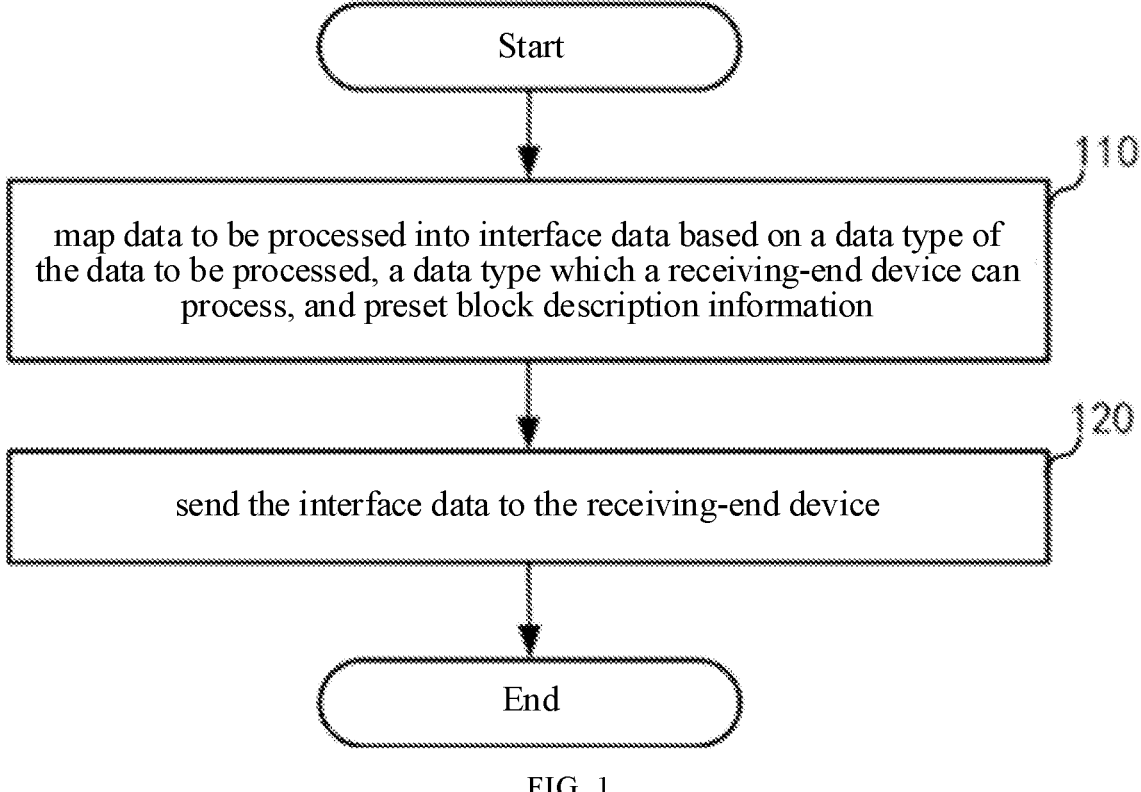
FIG. 1 is a flowchart illustrating an interface data processing method according to the present disclosure.

FIG. 1 is a flowchart illustrating an interface data processing method according to the present disclosure. The interface data processing method can be applied to a transmitting-end device. As shown in FIG. 1, the interface data processing method may include the following operations 110 and 120.

In the operation 110, data to be processed is mapped into interface data based on a data type of the data to be processed, a data type which a receiving-end device can process, and preset BD information.

The preset BD information includes configuration information and storage information. The configuration information includes a message header type, a message type, the amount of sliced data and the number of data containers; and the storage information at least includes a storage address of a data container, an identifier of the data container, the number of valid bits in the data container and the number of padding bits in the data container. Each piece of the sliced data includes M data containers, with M being an integer greater than or equal to 1.

It should be noted that the data container is a minimum unit of data storage, and each data container includes N bits of data, with N being an integer greater than or equal to 1. The above description of the BD information is merely for illustration, the BD information may be specifically set according to actual situations, and other BD information which is not described herein is also within the scope of the present disclosure, and will not be described in detail here.

Figure 2:
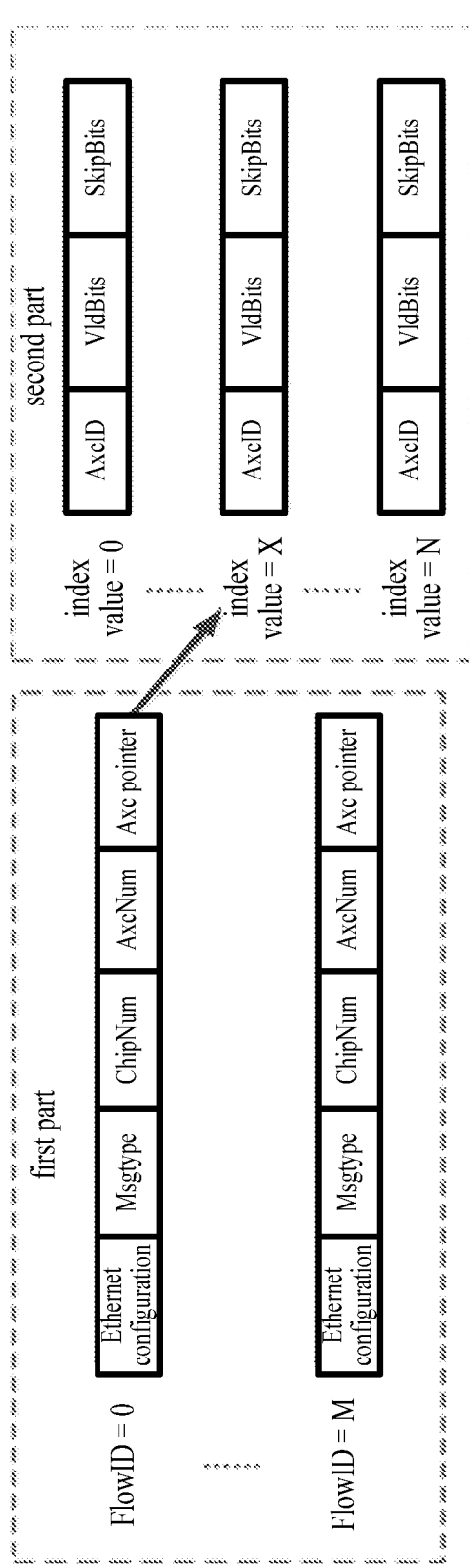
FIG. 2 is a schematic diagram of composition of preset BD information according to the present disclosure.

For example, FIG. 2 is a schematic diagram of composition of the preset BD information according to the present disclosure. As shown in FIG. 2, the BD information includes two parts, with a first part including a Flow Identifier (FlowID), Ethernet configuration, a message type, the number of timeslices (the chip number, ChipNum), the number of Axc, and an Axc pointer, and a second part including an index value, an Axc identifier, the number of valid bits, and the number of padding bits. A data flow refers to an independent data flow (e.g., a data flow of a time division multiplexing data type or a data flow of a packet data type) which has certain attribute characteristics and can be simultaneously processed by the transmitting-end device, and each data flow has an independent number, that is, the FlowID.

The Ethernet configuration includes information related to an Ethernet header (e.g., an Ethernet type). The message type (Msgtype) is configured to distinguish between types of data loaded in the data container, such as IQ data, Continuous Wave (CW) data, and different carrier data in the IQ data. The ChipNum is configured to indicate the number of timeslices included in a single data packet, and the ChipNum is equal to 1 in an application scenario of data slicing. The Axc pointer is configured to instruct to read from a storage address of the data container in the second part (for example, the Axc pointer points to a storage address having an index value equal to X). The AxcID is configured to indicate a timeslice location of a currently stored data segment in the data to be processed which is received. The number of valid bits (VldBits) is configured to indicate the number of bits occupied by valid data in a current data container, and the number of padding bits (SkipBits) is configured to indicate the number of bits occupied by unwanted data (i.e., data used to fill in empty locations) in the current data container.

When the transmitting-end device searches for data based on the structure shown in FIG. 2, each corresponding piece of configuration information in the first part is first found based on the FlowID, a corresponding index value in the second part is then obtained through the Axc pointer, and an identifier of a corresponding data container (i.e., an AxcID), the number of valid bits and the number of padding bits are finally obtained based on the index value, so that data stored in a buffer is obtained.

In the operation 120, the interface data is sent to the receiving-end device.

It should be noted that the interface data may be directly sent to the receiving-end device by transparent transmission, to reduce waiting time in a processing process and increase processing efficiency. Alternatively, the interface data may be encapsulated based on a corresponding encapsulation rule, and the encapsulated data is then sent to the receiving-end device. For example, the signaling data is subjected to transparent transmission, that is, the signaling data is directly sent to a receiving end; or, data header information of a corresponding transmission type may be added before the interface data based on the encapsulation rule to generate transmission data, and then the transmission data is sent to the receiving-end device. The above description of the format of the sent data is merely for illustration, the format of the sent data may be specifically set according to actual situations, and other formats of the sent data that are not described herein are also within the scope of the present disclosure, and will not be described in detail here.

In some specific implementations, the operation 120 may be implemented as follows: framing based on the interface data and Ethernet message header information to generate the transmission data, with the Ethernet message header information including header information of the eCPRI protocol or header information of the RoE protocol; and sending the transmission data to the receiving-end device.

The header information of the eCPRI protocol includes at least one of regular header information, an identifier of a destination device, or a sending sequence identifier, which are defined in the eCPRI protocol. The header information of the RoE protocol includes at least one of a subframe byte length (subyte), a FlowID, a data length (Length), a sending sequence number (SeqNum), or timeslice location information.

In some specific implementations, the transmission data further includes high layer data and/or IP data. For example, the IP data includes at least one of Internet Protocol version 4 (IPv4) data, Internet Protocol version 6 (IPv6) data, and UDP data, Virtual Local Area Network (VLAN) data, or Media Access Control (MAC) data.

By mapping the data to be processed into the interface data based on the data type of the data to be processed, the data type which the receiving-end device can process and the preset BD information, the number of used fronthaul interfaces can be reduced, the data to be processed of different data types can be converted into the interface data capable of being received by the receiving-end device, and logic resource overhead can be reduced, thereby reducing power consumption; moreover, the preset BD information can be flexibly set to ensure compatibility and expandability of data.

In some specific implementations, the operation 110 may be implemented through the following operations 111 to 113.

In the operation 111, a storage unit is divided into storage subunits corresponding to the data types based on the data types of the data to be processed, and the storage subunits include Buffer Blocks (BBs), and the BBs corresponding to different data types are different in data length.

For example, when the data type is the time division multiplexing data type, a corresponding one of the storage subunits may store the data based on timeslice information, and a length of each BB is set based on the timeslice information. For example, the number of the BBs occupied on each time division multiplexing channel may be determined based on a link jitter condition or based on a maximum delay compensation amount needed by the time division multiplexing data. When the data type is the packet data type, a corresponding one of the storage subunits may store the data in sequence based on a length of a data packet.

It should be noted that a BB is a set of sequentially and continuously arranged records, and is a data unit of transmission between a main memory and an input device/an output device/an external memory. The BB is a physical record of data, and a corresponding relationship between the BB and a logical record of data may include the following three forms: one BB is one logical record; one BB includes a plurality of logical records; and one logical record occupies a plurality of BBs. A size of the BB may be fixed or may be changeable, and a gap exists between the BBs. The size of the BB may be specifically set based on input efficiency, output efficiency, and a storage space.

In the operation 112, the data to be processed is buffered in a corresponding one of the storage subunits.

It should be noted that the data to be processed may be data of multiple different data types, and correspond to different division rules of the storage subunits, so as to facilitate quick indexing in the storage subunits and quick extraction from the storage subunits. For example, the data type of the data to be processed may be the time division multiplexing data type, the packet data type, an Ethernet message data type, etc. The above description of the data types of the data to be processed is merely for illustration, and other data types of the data to be processed that are not described herein are also within the scope of the present disclosure, may be specifically set based on specific situations, and will not be described in detail here.

In some specific implementations, when the data type of the data to be processed is a first preset type, the data to be processed is stored in a first preset storage subunit based on a timing location and the timeslice information, and a data length of a BB in the first preset storage subunit is a length determined based on the timeslice information; and when the data type of the data to be processed is a second preset type, the data to be processed is stored in a second preset storage subunit based on a message length of the data to be processed, and a data length of a BB in the second preset storage subunit is equal to a preset data length.

For example, when the first preset type is the time division multiplexing data type, the data to be processed is stored in timeslices based on the timing location, and is written to the corresponding first preset storage subunit based on a timeslice period (e.g., X timeslices, with X being an integer greater than or equal to 1). In a specific implementation, a length of a timeslice (i.e., one timeslice) may be set to 3.84 MHz. When the second preset type is the packet data type, data packets may be sequentially stored in a corresponding one of the storage subunits based on location information and the message length of the data to be processed.

In some specific implementations, storing the data to be processed in the first preset storage subunit based on the timing location and the timeslice information may include: determining the number of the BBs allocated to each time division multiplexing channel based on a delay jitter value and the timing location, with each BB including a data amount of K preset timeslices, and K being an integer greater than or equal to 1; and storing the data to be processed in the first preset storage subunit based on the number of the BBs and storage addresses of the BBs.

For example, if the number of the preset timeslices is 32, each BB includes 32 timeslices, and each time division multiplexing channel includes a plurality of BBs. The data to be processed is stored in the first preset storage subunit based on the above division rule, so as to ensure that corresponding data can be quickly and accurately acquired when searching the first preset storage subunit for the data.

In some specific implementations, storing the data to be processed in the second preset storage subunit based on the message length of the data to be processed may include: determining the number of the BBs needed by the data to be processed based on a preset unit message length and the message length of the data to be processed; and storing the data to be processed in the second preset storage subunit based on the number of the BBs and storage addresses of the BBs.

For example, when the preset unit message length is 2 K bytes, it may be determined based on the message length of the data to be processed (e.g., 200 K bytes) that the number of the BBs needed by the data to be processed is 100, then storage spaces of 100 BBs in the second preset storage subunit are allocated to the data to be processed, with each BB having a corresponding identifier, e.g., a Buffer Block ID (BBID), and a BB linked list is generated based on the 100 BBIDs (for example, an index identifier in the linked list may be an identifier obtained by a preset algorithm). For acquiring the data to be processed stored in the second preset storage subunit, a user merely needs to know a first BBID in the BB linked list, and then the remaining 99 BBIDs can be sequentially obtained by indexing, thereby acquiring the data to be processed. Thus, efficiency of data search and extraction is improved.

It should be noted that, in a case where the data length of the data to be processed is less than 2 K bytes, it is enough to allocate one BB to the data to be processed; and in a case where the data length of the data to be processed is relatively long, one BB is allocated to every 2 K bytes, and when the data length of the last part of the data is less than 2 K bytes, the last part of the data is still allocated one BB to ensure data integrity. Thus, when the data to be processed is acquired from the storage subunit based on the BBIDs, search and reading of the data to be processed are convenient, and reading efficiency is improved.

In the operation 113, the data to be processed in the storage subunit is mapped into the interface data based on the data type of the data to be processed, the data type which the receiving-end device can process, and the preset BD information.

For example, when the data type of the data to be processed is a CPRI data type and the data type which the receiving-end device can process is an eCPRI data type, the data to be processed in the storage subunit is mapped into the interface data of the eCPRI data type based on the preset BD information (e.g., the configuration structure shown in FIG. 2). Thus, when the interface data is directly sent to the receiving-end device, the receiving-end device can quickly process the interface data, with no need for other hardware interface conversion devices, which reduces a cost and increases a processing speed of the interface data.

Through the operations 111 to 113, the transmitting-end device and the receiving-end device, which are different in type, can communicate with each other directly, and the interface data can be processed quickly, with no need for the other hardware interface conversion devices, so that the cost is reduced, and the processing speed of the interface data is improved. Moreover, flexible networking among different types of devices can be ensured, and compatibility of the devices is improved.

FIG. 3 is a flowchart illustrating a method of mapping data to be processed in a storage subunit into interface data according to the present disclosure. As shown in FIG. 3, the operation 113 may include the following operations 1131 to 1134.

In the operation 1131, the data to be processed is extracted from the storage subunit based on the data type of the data to be processed and BBID.

For example, a type of a corresponding one of the storage subunits is determined based on the data type of the data to be processed; and then storage linked list information corresponding to the data to be processed may be searched for and obtained based on the BBID, and the data to be processed is sequentially extracted from the corresponding one of the storage subunits based on the storage linked list information, thereby accelerating an extraction speed of the data to be processed.

In the operation 1132, when both the data type which the receiving-end device can process and the data type of the data to be processed are the first preset type, and the data to be processed is data in which service data information is separated from signaling data information, the data to be processed in the storage subunit is mapped into the interface data based on the preset BD information and a line speed of the first preset type.

The signaling data information may include control word information, and may also include configuration signaling information. The above description of the signaling data information is merely for illustration, and other signaling data information that is not described herein is also within the scope of the present disclosure, may be specifically set based on specific situations, and will not be described in detail here.

For example, when the data to be processed is CPRI data in which the service data information is separated from the signaling data information and the data type which the receiving-end device can process is also the CPRI data type (that is, the first preset type is the time division multiplexing data type), a framing process of the CPRI data is actually to be completed. The data to be processed includes a plurality of pieces of timeslice data, each piece of timeslice data includes a plurality of data containers, and each data container has its own identifier (e.g., the Axc identifier). BD information is generated based on configuration information (e.g., the Axc identifier, the number of valid bits, and the number of padding bits) of each data container, sending sequence information of the timeslice data in the data to be processed is then determined based on the BD information (for example, a first piece of timeslice data is sent first, then a second piece of timeslice data is sent, and so on), and data to be sent is continuously read from the BBs in the storage subunit based on the sending sequence information and the FlowID of the data to be processed, and is mapped into the interface data, thereby completing the framing process of the CPRI data.

In the operation 1133, when the data type which the receiving-end device can process is a third preset type and the data type of the data to be processed is the first preset type, sending sequence information of the sliced data in the data to be processed is determined based on the preset BD information, and the data to be processed in the storage subunit is mapped into the interface data based on the sending sequence information and the FlowID of the data to be processed.

For example, when the third preset type is the Ethernet message data type and the first preset type is the time division multiplexing data type, sending sequence information of data flows (e.g., FlowIDs and sending sequence numbers (SeqNums) of the data flows) needs to be determined based on the BD information (e.g., the amount of timeslice data in each data flow), and the data to be processed in the storage subunit is mapped into the interface data based on the sending sequence information.

In some specific implementations, determining the sending sequence information of the sliced data in the data to be processed based on the preset BD information may include: determining the sending sequence information of the sliced data in the data to be processed based on the amount of the sliced data in the data to be processed and the identifiers of the data containers, with the sending sequence information including a sequence number and a length of the sliced data.

For example, the sending sequence information is determined based on the number of the timeslices (ChipNum) included in the data to be processed and the Axc identifiers. For example, the data to be processed includes three timeslices (i.e., a first timeslice, a second timeslice, and a third timeslice), each timeslice has a unique Axc identifier therein; and when a desired sending sequence as needed is: the second timeslice, the first timeslice and the third timeslice, a sequence number of the second timeslice is 1, a sequence number of the first timeslice is 2, and a sequence number of the third timeslice is 3, and corresponding data is sequentially extracted from the storage subunit based on the Axc identifier corresponding to each timeslice and the sequence number of each timeslice, and is combined into the interface data based on the sending sequence.

In the operation 1134, when the data type which the receiving-end device can process is the third preset type and the data type of the data to be processed is the second preset type, the data to be processed in the storage subunit is mapped into the interface data based on a length of a data packet in the data to be processed, the FlowID of the data to be processed, and the preset BD information.

For example, when the third preset type is the Ethernet message data type, the second preset type is the packet data type, the length of the data packet in the data to be processed is 20 K bytes, a preset length of a storage unit (e.g. the length of each BB) is 2 K bytes, and the FlowID of the data to be processed is equal to 5, configuration information (e.g., a storage address corresponding to the Axc pointer) for a case where the FlowID is equal to 5 needs to be extracted from the storage subunit, and then data in 10 BBs is sequentially extracted from the storage subunit based on the configuration information, with the extracted data used as the interface data.

In some specific implementations, mapping the data to be processed in the storage subunit into the interface data based on the preset BD information and the line speed of the first preset type may include: determining the line speed of the first preset type based on the amount of the sliced data in the data to be processed and the number of the data containers; updating the preset BD information based on the line speed of the first preset type to obtain updated BD information; and mapping the data to be processed into the interface data based on the updated BD information.

For example, a CPRI line rate may be determined based on any one or more of a sampling rate, a data bit width, the number of IQ data, the number of antennas, the number of carriers, CPRI line coding efficiency, and CPRI frame efficiency. The sampling rate represents the number of sampling points in one second. The IQ data is data transmitted in such a way that a signal vector is decomposed into two components, which are the same in frequency and peak amplitude, but differ in phase by 90 degree, and the IQ data is generally represented by a sine signal (a Q component) and a cosine signal (an I component) (that is, the number of the IQ data is 2), thereby improving frequency band utilization. The CPRI line coding efficiency is an efficiency of electrical/optical conversion of CPRI data. Since the CPRI data itself has certain control word overheads and thus needs to occupy certain transmission resources, the CPRI frame efficiency is not 100%, for example, the CPRI frame efficiency may be 90%. By using the updated BD information to map the data to be processed, a mapping speed of the data to be processed is increased, and accuracy of data processing is improved.

By mapping the data of the first preset type or the second preset type into the interface data of the third preset type, or subjecting the data of the first preset type to framing, normal communication between the transmitting-end device and the receiving-end device can be ensured, and networking and communication can be performed between devices having different interfaces, thereby improving compatibility of the devices. In addition, the above mapping process does not need connection to the other hardware interface conversion devices, so that the cost is reduced, and the processing speed of the interface data is improved.

Figure 4:
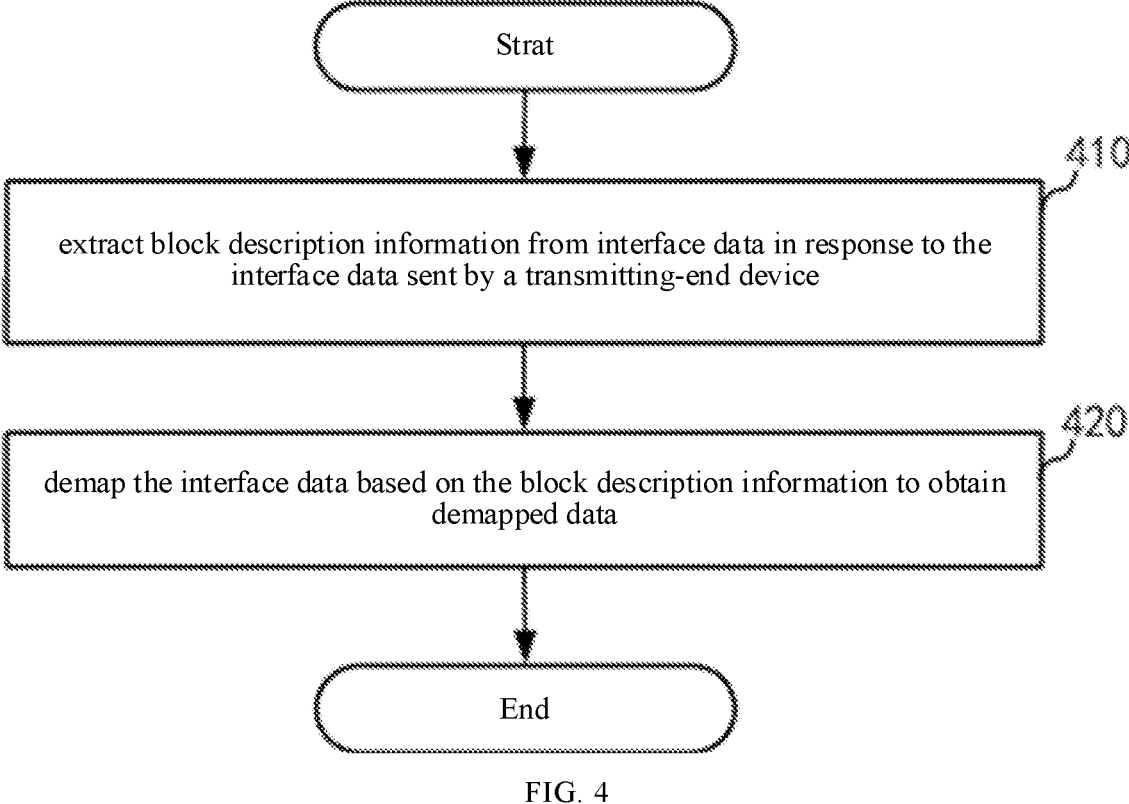
FIG. 4 is another flowchart illustrating an interface data processing method according to the present disclosure.

FIG. 4 is another flowchart illustrating an interface data processing method according to the present disclosure. The interface data processing method can be applied to a receiving-end device. As shown in FIG. 4, the interface data processing method may include the following operations 410 to 420.

In the operation 410, BD information in interface data is extracted in response to the interface data sent by a transmitting-end device.

The BD information may include configuration information and storage information. The configuration information includes a message header type, a message type, the amount of sliced data and the number of data containers; and the storage information at least includes a storage address of a data container, an identifier of the data container, the number of valid bits in the data container and the number of padding bits in the data container. Each piece of the sliced data includes M data containers, with M being an integer greater than or equal to 1.

In the operation 420, the interface data is demapped based on the BD information to obtain the demapped data.

For example, the BD information includes key information and a preset configuration parameter in the interface data, and the interface data is demapped to data which the receiving-end device can process (i.e., the demapped data) based on the key information and the preset configuration parameter, so that the receiving-end device may quickly obtain the key information in the interface data and quickly perform corresponding processing. For example, when the interface data is service data of a certain type, feedback on the service data is provided in time, so as to ensure that a service may be performed stably and continuously, thereby improving user experience.

In some specific implementations, the operation 420 may include: an operation 421, determining a data type of data to be stored in the interface data; and an operation 422, demapping the interface data based on the data type of the data to be stored and a timing relationship in the BD information to obtain the demapped data.

Based on the data type of the data to be stored and the timing relationship in the BD information, it can be ensured that each frame of data is demapped based on a certain time order (e.g., a preset sending sequence), so that a packet loss caused when data packets do not uniformly reach the receiving-end device can be reduced, for example, image lagging which is caused by the packet loss when a user is watching a video can be reduced. Demapping the interface data based on the timing relationship can correct processing time of the interface data of the receiving-end device in time, reduce message jitter and improve the user experience.

In some specific implementations, the operation 422 may include the following operations 4221 and 4222.

In the operation 4221, when the data type of the data to be stored is a first preset type, the configuration information and the storage information in the BD information are determined based on a line speed of the first preset type; and the data to be stored is sequentially extracted from the interface data based on the configuration information, the storage information and the timing relationship in the BD information, so as to generate the demapped data.

For example, when the first preset type is the time division multiplexing data type, a deframing process of time division multiplexing data is to be completed. For example, when a protocol type of the time division multiplexing data is the eCPRI protocol, key fields in the time division multiplexing data may be extracted and used as a part of the BD information. For example, the key fields may be message identifier information and a sending sequence identifier in header information of the eCPRI protocol. The message identifier information may be user-defined message identifier information, or may be any one or more of a physical channel identifier, an antenna port identifier, a measurement information identifier, a control information identifier, and a configuration information identifier. Then, the data to be stored is sequentially extracted from the interface data based on the preset configuration information, the preset storage information and the timing relationship (e.g., the sending sequence identifier) in the BD information to generate the demapped data, and the demapped data is stored in a corresponding one of the storage subunits. For example, the data to be stored is stored in a corresponding one of the storage subunits based on a timeslice location of the time division multiplexing data and a period of X timeslices, with X being an integer greater than or equal to 1, and a length of each timeslice being 3.84 MHz.

In the operation 4222, when the data type of the data to be stored is a third preset type, the number of data containers in the data to be stored is calculated based on a data length of the interface data and sending sequence information in the BD information; and the interface data is demapped based on the number of the data containers, the timing relationship and the sending sequence information to obtain the demapped data.

For example, the third preset type is the Ethernet message data type, and Ethernet message data includes a data packet. For example, when the data length of the interface data is 20 K bytes and a preset length of a storage unit (e.g., a length of each BB) is 2 K bytes, it may be obtained by calculation that the number of the data containers (i.e., the number of BBs) is 10, and then the interface data is demapped based on the timing relationship and the sending sequence information (e.g., the sending sequence identifier), so as to obtain the demapped data (that is, the interface data is split into data packets in 10 BBs).

Through the extraction of the BD information from the interface data, different types of received data are parsed to obtain parsed data; and then the interface data is demapped based on the BD information to obtain the demapped data, so as to obtain the data which the receiving-end device can process. It is ensured that, when receiving different types of data, the receiving-end device can quickly convert the different types of the received data into a data type which the receiving-end device can process, which improves data compatibility and obviates the need for other protocol conversion devices. Thus, the logic resource overhead can be effectively reduced, and the power consumption can be reduced.

In some specific implementations, after the operation 420, the method may further include: writing the demapped data to a storage unit based on the timing relationship in the BD information.

Writing the demapped data to the storage unit based on the timing relationship ensures that the demapped data is stored based on a certain time order, so that the packet loss caused when the data packets do not uniformly reach the receiving-end device is reduced, the processing time of the interface data of the receiving-end device is corrected in time, and the message jitter is reduced, thereby improving the user experience.

In some specific implementations, the interface data processing method applied to the receiving-end device may further include: demapping the interface data based on a corresponding relationship between IP data and the FlowID in the interface data and/or a corresponding relationship between a physical address of a current receiving-end device and the FlowID in the interface data, so as to obtain the demapped data.

It should be noted that the FlowID in the received interface data may be extracted, so that the interface data may be sequentially demapped based on the FlowID; or a mapping relationship table of data flow may be established in advance, so that the interface data may be demapped based on the mapping relationship table of data flow. The mapping relationship table of data flow may include the FlowID, a type of a data flow, an address of a sender of the data flow, and an address of a receiver of the data flow. The above description of the information in the mapping relationship table of data flow is merely for illustration, the information in the mapping relationship table of data flow may be specifically set according to actual situations, and other information in the mapping relationship table of data flow that is not described herein is also within the scope of the present disclosure, and will not be described in detail here.

Figure 5:
FIG. 5 is a schematic diagram illustrating a mapping relationship between a Flow Identifier (FlowID) in a receiving direction and a receiving port according to the present disclosure.

For example, FIG. 5 is a schematic diagram illustrating a mapping relationship between a FlowID in a receiving direction and a receiving port according to the present disclosure. As shown in FIG. 5, the received data includes key information such as a MAC address, an IP address, and a UDP port, and a mapping relationship is established between the key information and the FlowID, so as to ensure quick processing of the received data.

Some key information may be extracted from the interface data, so that a mapping relationship between the interface data and a data flow may be determined based on the extracted key information, thereby determining a FlowID. Then data of the sender and data of the receiver are demapped based on the FlowID to obtain the data which a device of the receiver can process.

By demapping the interface data based on the corresponding relationship between the IP data and the FlowID in the interface data and/or the corresponding relationship between the physical address of the current receiving-end device and the FlowID in the interface data to obtain the demapped data, processing efficiency of the interface data is improved, and meanwhile the receiving-end device does not need to be externally connected to other hardware interface conversion devices, which reduces the cost.

A transmitting-end device according to the embodiments of the present disclosure is described in detail below with reference to the drawings.

Figure 6:
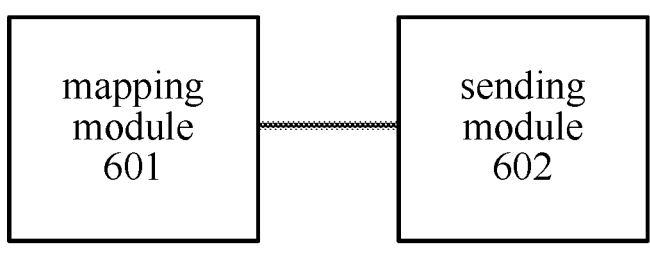
FIG. 6 is a block diagram of a transmitting-end device according to the present disclosure.

FIG. 6 is a block diagram of a transmitting-end device according to the present disclosure. As shown in FIG. 6, the transmitting-end device includes: a mapping module 601 configured to map data to be processed into interface data based on a data type of the data to be processed, a data type which a receiving-end device can process, and preset BD information; and a sending module 602 configured to send the interface data to the receiving-end device.

By using the mapping module to map the data to be processed into the interface data based on the data type of the data to be processed, the data type which the receiving-end device can process and the preset BD information, the number of used fronthaul interfaces can be reduced, the data to be processed of different data types can be converted into the interface data capable of being received by the receiving-end device, and the logic resource overhead can be reduced, thereby reducing the power consumption; moreover, the preset BD information can be flexibly set to ensure the compatibility and expandability of data.

Figure 7:
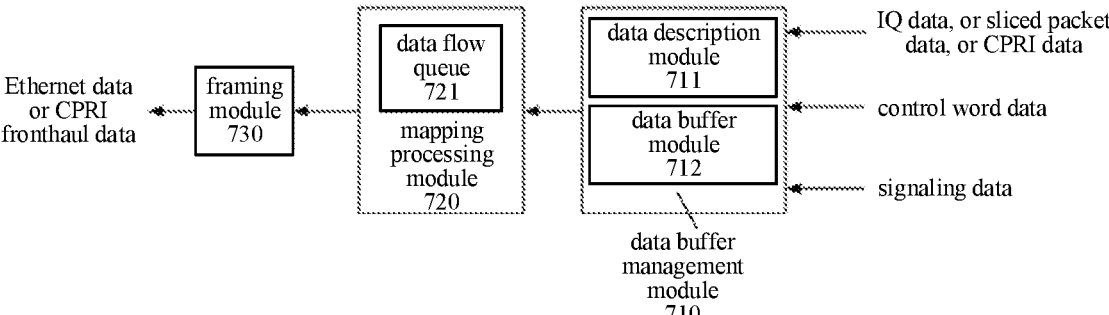
FIG. 7 is another block diagram of a transmitting-end device according to the present disclosure.

FIG. 7 is another block diagram of a transmitting-end device according to the present disclosure. As shown in FIG. 7, the transmitting-end device includes a data buffer management module 710, a mapping processing module 720 and a framing module 730, which are connected in sequence. The data buffer management module 710 includes a data description module 711 and a data buffer module 712, and the mapping processing module 720 includes a data flow queue 721.

The data type of the data to be processed received by the data buffer management module 710 may include three cases: in a first case, the data to be processed is time division multiplexing data and has formed CPRI data, so that CPRI data flows received may be cyclically written to the data buffer module 712 of the data buffer management module 710 based on a receiving sequence; in a second case, the data to be processed is the time division multiplexing data, and In-phase Quadrature (IQ) data, control word data and signaling data in the data to be processed are separated, so that a storage space of one BB may be allocated to the control word data, a storage space of one BB may be allocated to the signaling data, then N BBs may be allocated to the IQ data based on a link condition, and the IQ data, the control word data and the signaling data in a second type of data are cyclically written to the corresponding BBs based on reception time of the second type of data, with N being an integer greater than or equal to 1; and in a third case, the data to be processed is sliced packet data, slicing of the packet data is directly completed through Direct Memory Access (DMA), and a message length (Length) and a corresponding FlowID of the sliced packet data may be obtained when the slicing of the packet data is completed through DMA. Information related to the sliced packet data is configured with the data description module 711 based on the structure shown in FIG. 2 to obtain configuration information. For example, the number of Axcs (AxcNum) is obtained through calculation based on Length, ChipNum is configured to be 1, an address of an Axc pointer is configured to be 0, an Axc identifier is configured to start from 0 and then be sequentially added up from 0, the number of padding bits (SkipBits) is configured to be a fixed value (e.g., 5 or 8), and the number of valid bits (VldBits) is configured to be 0. The data buffer module 712 stores the sliced packet data in a BB corresponding to the FlowID based on the configuration information determined by the data description module 711, and sends a BBID of the BB and the FlowID to a data flow queue 721 of the mapping processing module 720.

It should be noted that the mapping processing module 720 performs different corresponding mapping processes on the data of the above three different data types. For example, in a case where the data to be processed is of the second type and a CPRI data flow needs to be output, what is actually performed by the mapping processing module 720 is a framing process of CPRI data. The mapping processing module 720 uses one data flow and determines BD information based on a line rate of the CPRI data, for example, the data of the second type includes a plurality of pieces of timeslice data, each piece of timeslice data includes Axc-Num, the number of padded IQ data, and the number of control word data and signaling data, and the BD information is generated based on AxcID, VldBits and SkipBits corresponding to each piece of Axc data. The mapping processing module 720 determines sending sequence information of the timeslice data in the data to be processed based on the BD information (for example, a first piece of timeslice data is sent first, then a second piece of timeslice data is sent, and so on), then continuously reads data to be sent from the BBs in the data buffer module 712 based on the sending sequence information and the FlowID of the data to be processed, interleaves the IQ data in the data to be sent to generate interleaved data, and then forms the CPRI data flow based on the interleaved data and the data to be sent, thereby completing the framing process of the CPRI data.

In a case where the data to be processed is the time division multiplexing data and an Ethernet data message (e.g., eCPRI data or RoE data) needs to be output, sending sequence information (e.g., a FlowID and a sending sequence number (SeqNum) of a data flow) of a data flow needs to be determined based on the BD information (e.g., the amount of timeslice data in each data flow), and the data to be sent needs to be sent to the data flow queue 721 based on the sending sequence information.

In a case where the data to be processed is the sliced packet data and the Ethernet data message (e.g., the eCPRI data or the RoE data) needs to be output, the data to be processed in a storage subunit is mapped into the interface data based on a length of a data packet in the data to be processed, the FlowID of the data to be processed, and the preset BD information. For example, BD information corresponding to a data flow is extracted from the data description module 711 based on the FlowID (for example, Axc-Num, AxcID, VldBits and SkipBits of Axc data corresponding to the FlowID are obtained), and corresponding Axc data is extracted from the data buffer module 712 based on the BD information; and then, all Axc data are arranged, header information of the Ethernet data message (e.g., message identifier information and a sending sequence identifier (SeqID) in header information of the eCPRI data) or header information of the RoE data (e.g., a subframe byte length (subyte), a FlowID, a data length (Length), and a sending sequence number (SeqNum)) is added based on a message type (Msgtype) in the BD information to generate spliced data, and the spliced data is sent to the framing module 730. Msgtype is a type determined based on configuration information of an application layer, and the head information may further include timeslice location information.

The framing module 730 generates transmission data, which includes the data processed by the mapping processing module 720, based on the data sent by the mapping processing module 720, and it may be determined based on Msgtype in the BD information whether to carry high layer data and/or IP data in the transmission data. The IP data includes at least one of IPv4 data, IPv6 data, UDP data, VLAN data, or MAC data.

It should be noted that the mapping processing module 720 may further support transparent transmission of data flows, for example, with no header information of the Ethernet data message added, the data to be processed is directly extracted from the data buffer module 712 and sent to the receiving-end device. In specific implementations, the signaling data or CPRI frame data may be subjected to transparent transmission.

With the data buffer management module storing the received data to be processed in the corresponding BBs based on the different data types and generating the BD information at the same time, quick extraction of desired data by the mapping processing module can be facilitated; with the mapping processing module performing the corresponding mapping processes on the buffered data based on the different data types of the buffered data and the data type (i.e., a data type of data to be output) which the receiving-end device can process, the data to be processed of the different data types can be converted into the interface data capable of being received by the receiving-end device, so that the logic resource overhead is reduced, thereby reducing the power consumption; with the framing module processing the mapped data, such as adding the header information of the Ethernet data, data transmission can be facilitated, the receiving-end device can quickly and accurately receive the interface data sent by the transmitting-end device, normal communication can be realized among devices of different types, and compatibility of the devices can be improved; moreover, the data types of the data to be processed can be expanded to meet mapping requirements of the different data types, thereby improving data expandability.

A receiving-end device according to the embodiments of the present disclosure is described in detail below with reference to the drawings.

Figure 8:
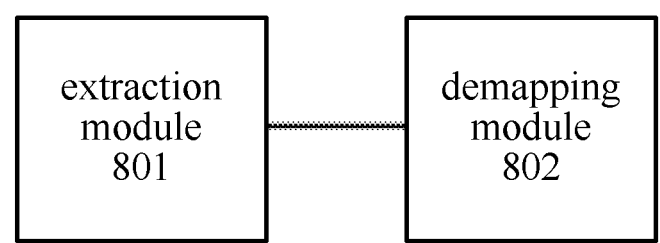
FIG. 8 is a block diagram of a receiving-end device according to the present disclosure.

FIG. 8 is a block diagram of a receiving-end device according to the present disclosure. As shown in FIG. 8, the receiving-end device may include: an extraction module 801 configured to extract BD information from interface data in response to the interface data sent by a transmitting-end device; and a demapping module 802 configured to demap the interface data based on the BD information to obtain demapped data.

With the BD information extracted by the extraction module from the interface data, different types of received data are parsed accordingly to obtain parsed data; and then the interface data is demapped based on the BD information to obtain the demapped data, so as to obtain the data which the receiving-end device can process. It is ensured that, when receiving the different types of data, the receiving-end device can quickly convert the different types of the received data into a data type which the receiving-end device can process, which improves the data compatibility and obviates the need for other protocol conversion devices. Thus, the logic resource overhead can be effectively reduced, and the power consumption can be reduced.

Figure 9:
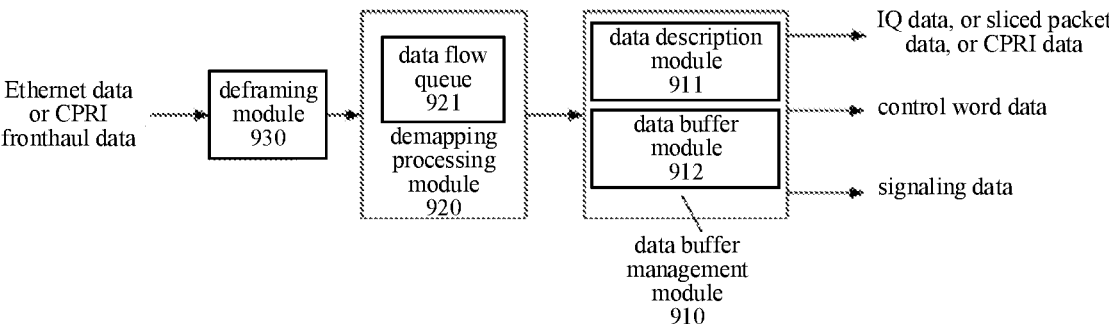
FIG. 9 is another block diagram of a receiving-end device according to the present disclosure.

FIG. 9 is another block diagram of a receiving-end device according to the present disclosure. As shown in FIG. 9, the receiving-end device includes a deframing module 930, a demapping processing module 920, and a data buffer management module 910. The demapping processing module 920 includes a data flow queue 921, and the data buffer management module 910 includes a data description module 911 and a data buffer module 912.

Data received by the deframing module 930 may be Ethernet data or CPRI fronthaul data. When the deframing module 930 receives the CPRI fronthaul data, the deframing module 930 extracts IQ data, control word data, and signaling data from the CPRI fronthaul data regularly based on the preset BD information. Then, a storage space of one BB is allocated to the control word data, a storage space of one BB is allocated to the signaling data, N BBs are allocated to the IQ data based on a link condition, and the IQ data is sequentially written to the data buffer module 912 through the data flow queue 921 based on a receiving sequence of the CPRI data. The CPRI fronthaul data includes a plurality of pieces of timeslice data, and each piece of timeslice data includes AxcNum, the number of padded IQ data, and the number of control word data and signaling data, with N being an integer greater than or equal to 1. When the data stored needs to be extracted from the data buffer module 912, the data is sequentially read from the data buffer module 912 based on a timing relationship (e.g., the sending sequence), thereby performing a delay compensation function.

The deframing module 930 is configured to parse header information of the Ethernet data, and extract BD information (e.g., a message length, a FlowID, and a message type) from the header information. In order to free the receiving-end device from a FlowID in a data message sent by the transmitting-end device, a key field in the data message sent by the transmitting-end device may be mapped into a self-defined FlowID, so that the FlowID in the data message may be replaced with the key field. Alternatively, some data messages may be subjected to transparent transmission based on characteristics of the data messages, that is, the data messages are not processed, or the header information of the Ethernet data is stripped off, thereby improving a processing speed of the data.

The demapping processing module 920 is configured to extract corresponding BD information from the data buffer module 912 based on the FlowID, and buffer the demapped data in the data buffer module 912. When a data type of data to be output is the CPRI data type, the demapping processing module 920 completes deframing of CPRI data. When the data type of the data to be output is the packet data type, corresponding BD information is extracted from the data buffer module 912, packet data is demapped based on the BD information, and the demapped data is buffered in the data buffer module 912.

The data buffer management module 910 is configured to store the demapped data in the data buffer module 912. The demapped data is stored based on the data types thereof.

When the deframing module 930 receives the Ethernet data, the deframing module 930 parses the header information of Ethernet data in the Ethernet data to obtain configuration information of the Ethernet data; and then, a protocol type of the Ethernet data is determined based on the configuration information, and the protocol type may include the RoE protocol or the eCPRI protocol; and key fields in the Ethernet data are extracted and used as a part of the BD information based on the protocol type. For example, the key fields may be message identifier information and a sending sequence identifier in header information of eCPRI data, or may be a subframe byte length, a FlowID, a data length, and a sending sequence number in header information of RoE data. The key fields are sequentially written to the data description module 911 through the data flow queue 921, and the other parts of the BD information may be preset based on a high layer protocol and stored in the data description module 911. Then, corresponding BD information is searched for with the FlowID used as an index. The sending sequence number includes a timeslice location in the Ethernet data. The parsed data is sequentially stored in the data buffer module 912 through the data flow queue 921 based on the timeslice location, a corresponding AxcID and other information. For example, the demapped data is stored in the data buffer module 912 based on the timeslice location and a period of X timeslices, with X being an integer greater than or equal to 1, and a length of each timeslice being 3.84 MHz.

It should be noted that, for the IQ data, the header information of the Ethernet data in the IQ data needs to be removed when the IQ data is parsed; and for the signaling data, the whole signaling data needs to be sequentially stored in the data buffer module 912 through the data flow queue 921 when the signaling data is parsed. When PDU data of the eCPRI data includes a plurality of pieces of eCPRI information, the demapping processing module 920 needs to be used to complete separation of different pieces of eCPRI information, and then all pieces of eCPRI information are sequentially stored in BBs in the data buffer module 912. When the data stored in the data buffer module 912 needs to be used, Axc data may be cyclically read from the BBs in the data buffer module 912 based on the timing relationship and the sending sequence, so as to complete message jitter absorption. For example, when an interval between a message A and a message B in received data messages is 5 seconds, the interval between the message A and the message B may be appropriately decreased based on the timing relationship when the data stored in the data buffer module 912 needs to be used, so as to improve jitter of the messages. For example, the message A and the message B which are stored are extracted from the data buffer module 912 without an interval, that is, the interval between the message A and the message B is 0.

When the Ethernet data received by the deframing module 930 includes data of the packet data type, some configuration information in the BD information needs to be set to fixed values, for example, ChipNum is configured to be 1, an Axc pointer is configured to be 0, AxcID is configured to start from 0 and then be sequentially added up from 0, the number of valid bits is configured to be a fixed value (e.g., 5), and the number of padding bits is configured to be 0. Then, the packet data is sequentially stored in the data buffer module 912 based on locations. Meanwhile, the BD information is stored in the data description module 911, and the BD information may include: configuration information of a data flow, description information of Axc data, message description information, etc. In particular, part of the BD information may also be stored in the demapping module 920.

The received data of the different types is parsed by the deframing module to obtain the parsed data, the parsed data is then processed by the demapping processing module to obtain the data which the receiving-end device can process, and the data which the receiving-end device can process is stored in the data buffer management module. It is ensured that, when receiving the different types of data, the receiving-end device can quickly convert the different types of the received data into a data type which the receiving-end device can process, which improves the data compatibility and obviates the need for other protocol conversion devices. Thus, the logic resource overhead can be effectively reduced, and the power consumption can be reduced.

It should be noted that the present disclosure is not limited to the specific configuration and processing described in the above embodiments and illustrated by the drawings. For convenience and simplicity of the description, detailed description of a known method is omitted herein, and reference may be made to the corresponding processes in the foregoing method embodiments for specific operation processes of the system, the module and the unit described above, and those specific operation processes will not be described in detail here.

Figure 10:
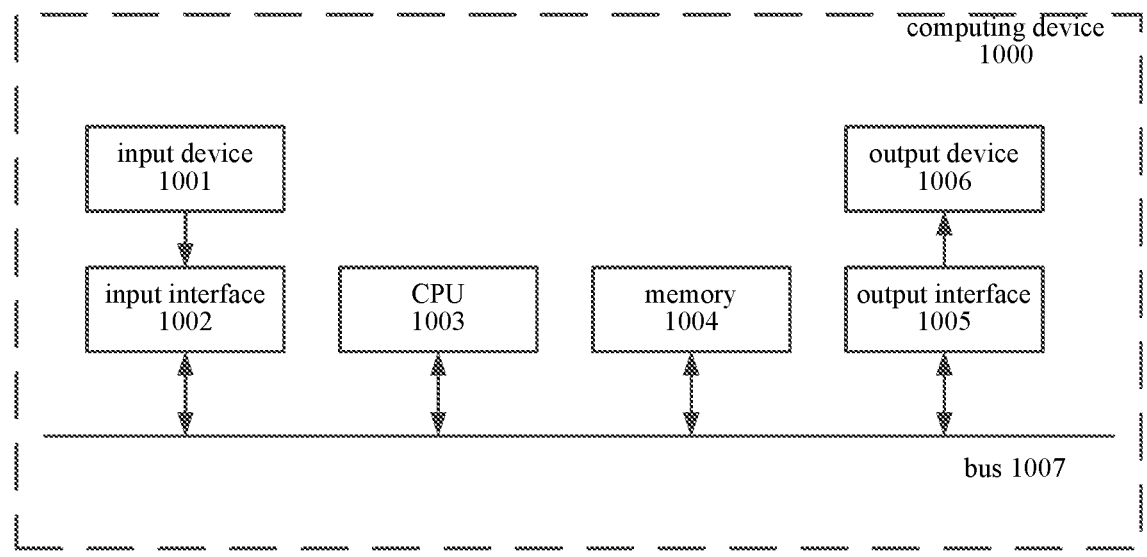
FIG. 10 is a block diagram illustrating an exemplary hardware architecture of a computing device capable of implementing an interface data processing method and devices according to the present disclosure.

FIG. 10 is a block diagram illustrating an exemplary hardware architecture of a computing device capable of implementing an interface data processing method and devices according to the present disclosure.

As shown in FIG. 10, the computing device 1000 includes an input device 1001, an input interface 1002, a central processing unit (CPU) 1003, a memory 1004, an output interface 1005, and an output device 1006. The input interface 1002, the CPU 1003, the memory 1004, and the output interface 1005 are connected to each other via a bus 1007, and the input device 1001 and the output device 1006 are connected to the bus 1007 via the input interface 1002 and the output interface 1005, respectively, thereby being further connected to other components of the computing device 1000.

Specifically, the input device 1001 receives input information from the outside, and transmits the input information to the CPU 1003 via the input interface 1002; the CPU 1003 processes the input information based on a computer-executable instruction stored in the memory 1004 to generate output information, temporarily or permanently stores the output information in the memory 1004, and then transmits the output information to the output device 1006 via the output interface 1005; and the output device 1006 outputs the output information outside the computing device 1000 for being used by a user.

In an embodiment, the computing device shown in FIG. 10 may be implemented as a network device, which may include: a memory configured to store a program; and a processor configured to execute the program stored in the memory to perform the interface data processing method described in the above embodiments.

In an embodiment, the computing device shown in FIG. 10 may be implemented as an interface data processing system, which may include: a memory configured to store a program; and a processor configured to execute the program stored in the memory to perform the interface data processing method described in the above embodiments.

The description above is merely of the exemplary embodiments of the present disclosure, and is not intended to limit the scope of the present disclosure. In general, the various embodiments of the present disclosure may be implemented by hardware or special circuits, software, logic or any combination thereof. For example, some aspects of the present disclosure may be implemented by hardware and other aspects of the present disclosure may be implemented by firmware or software executable by a controller, a microprocessor or another computing device, but the present disclosure is not limited thereto.

The embodiments of the present disclosure may be implemented by a data processor of a mobile device executing computer program instructions. For example, the embodiments of the present disclosure are implemented in a processor entity, or by hardware, or by a combination of software and hardware. The computer program instructions may be assembly instructions, Instruction Set Architecture (ISA) instructions, machine instructions, machine-related instructions, microcode, firmware instructions, state setting data, or source code or object code written in one programming language or in any combination of a plurality of programming languages.

A block diagram illustrating any logic flow in the drawings of the present disclosure may show operations of a program, or interconnected logic circuits, modules and functions, or a combination of the operations of the program and the logic circuits, modules and functions. The computer program can be stored on the memory. The memory may be in any type suitable to local technical environment and may be implemented using any suitable data storage technology. For example, the memory is, but not limited to, a Read-Only Memory (ROM), a Random Access Memory (RAM), and an optical storage device and system (a Digital Video Disc (DVD) or a Compact Disc (CD)). The computer-readable medium may include a non-transitory storage medium. The data processor may be in any type suitable to the local technical environment. For example, the data processor is, but not limited to, a general purpose computer, a special purpose computer, a microprocessor, a Digital Signal Processors (DSP), an Application Specific Integrated Circuit (ASIC), a Field Programmable Gate Array (FGPA) and a processor based on multi-core architecture.

The exemplary embodiments of the present disclosure are described in detail above by exemplary and non-limiting examples. For those of ordinary skill in the art, various modifications and adjustments to the above embodiments can be obviously derived from the drawings and the appended claims, but those modifications and adjustments are not beyond the scope of the present disclosure. Therefore, the proper scope of the present disclosure is defined by the appended claims.

What is claimed is:

1. A method of processing interface data, comprising:
mapping data to be processed into interface data based on a data type of the data to be processed, a data type which a receiving-end device can process, and preset block description information; and
sending the interface data to the receiving-end device
wherein mapping the data to be processed into the interface data based on the data type of the data to be processed, the data type which the receiving-end device can process, and the preset block description information comprises:
dividing, based on data types of data to be processed, a storage unit into storage subunits corresponding to the data types, wherein the storage subunits comprise buffer blocks, and the buffer blocks corresponding to different data types are different in data length;
buffering the data to be processed in a corresponding one of the storage subunits; and
mapping the data to be processed in the storage subunit into the interface data based on the data type of the data to be processed, the data type which the receiving-end device can process, and the preset block description information,
wherein mapping the data to be processed in the storage subunit into the interface data based on the data type of the data to be processed, the data type which the receiving-end device can process, and the preset block description information comprises:
extracting the data to be processed from the storage subunit based on the data type of the data to be processed and an identifier of the buffer block;
mapping, when both the data type which the receiving-end device can process and the data type of the data to be processed are a first preset type and the data to be processed is data in which service data information is separated from signaling data information, the data to be processed in the storage subunit into the interface data based on the preset block description information and a line speed of the first preset type,
wherein the preset block description information comprises configuration information and storage information, the configuration information comprises a message header type, a message type, the amount of sliced data and the number of data containers
wherein mapping the data to be processed in the storage subunit into the interface data based on the preset block description information and the line speed of the first preset type comprises:
determining the line speed of the first preset type based on the amount of the sliced data in the data to be processed and the number of the data containers;
updating the preset block description information based on the line speed of the first preset type to obtain updated block description information; and
mapping the data to be processed into the interface data based on the updated block description information.

2. The method of claim 1, wherein mapping the data to be processed in the storage subunit into the interface data based on the data type of the data to be processed, the data type which the receiving-end device can process, and the preset block description information further comprises:
determining, when the data type which the receiving-end device can process is a third preset type and the data type of the data to be processed is the first preset type, sending sequence information of sliced data in the data to be processed based on the preset block description information, and mapping the data to be processed in the storage subunit into the interface data based on the sending sequence information and a flow identifier of the data to be processed; and
mapping, when the data type which the receiving-end device can process is the third preset type and the data type of the data to be processed is a second preset type, the data to be processed in the storage subunit into the interface data based on a length of a data packet in the data to be processed, the flow identifier of the data to be processed, and the preset block description information.

3. The method of claim 2, wherein the storage information comprises a storage address of a data container, an identifier of the data container, the number of valid bits in the data container and the number of padding bits in the data container, wherein each piece of the sliced data comprises M data containers, M being an integer greater than or equal to 1.

4. The method of claim 3, wherein determining the sending sequence information of the sliced data in the data to be processed based on the preset block description information comprises:
determining the sending sequence information of the sliced data in the data to be processed based on the amount of the sliced data in the data to be processed and the identifier of the data container,
wherein the sending sequence information comprises a sequence number and a length of the sliced data.

5. The method of claim 1, wherein buffering the data to be processed in the corresponding one of the storage subunits comprises:
storing, when the data type of the data to be processed is a first preset type, the data to be processed in a first preset storage subunit based on a timing location and timeslice information, wherein a data length of a buffer block in the first preset storage subunit is a length determined based on the timeslice information; and
storing, when the data type of the data to be processed is a second preset type, the data to be processed in a second preset storage subunit based on a message length of the data to be processed, wherein a data length of a buffer block in the second preset storage subunit is equal to a preset data length.

6. The method of claim 5, wherein storing the data to be processed in the first preset storage subunit based on the timing location and the timeslice information comprises:
determining the number of buffer blocks allocated to each time division multiplexing channel based on a delay jitter value and the timing location, wherein each buffer block comprises a data amount of K preset timeslices, K being an integer greater than or equal to 1; and
storing the data to be processed in the first preset storage subunit based on the number of the buffer blocks and storage addresses of the buffer blocks.

7. The method of claim 5, wherein storing the data to be processed in the second preset storage subunit based on the message length of the data to be processed comprises:
determining the number of the buffer blocks needed by the data to be processed based on a preset unit message length and the message length of the data to be processed; and storing the data to be processed in the second preset storage subunit based on the number of the buffer blocks and storage addresses of the buffer blocks.

8. The method of claim 1, wherein sending the interface data to the receiving-end device comprises:

framing based on the interface data and Ethernet message header information to generate transmission data, wherein the Ethernet message header information comprises header information of Enhanced Common Public Radio Interface (eCPRI) protocol or header information of Radio over Ethernet (RoE) protocol; and sending the transmission data to the receiving-end device.

9. The method of claim 8, wherein the transmission data further comprises high layer data or Internet Protocol data.

10. A network device, comprising:

one or more processors; and a memory having stored thereon one or more programs which, when executed by the one or more processors, cause the one or more processors to perform the interface data processing method of claim 1.

11. A non-transitory readable storage medium storing a computer program which, when executed by a processor, facilitates to execution of the interface data processing method of claim 1.

12. An interface data processing method, comprising:

extracting, in response to interface data sent by a transmitting-end device, block description information from the interface data; and demapping the interface data based on the block description information to obtain demapped data, wherein demapping the interface data based on the block description information to obtain the demapped data comprises:

determining a data type of data to be stored in the interface data; and demapping the interface data based on the data type of the data to be stored and a timing relationship in the block description information to obtain the demapped data, and wherein demapping the interface data based on the data type of the data to be stored and the timing relationship in the block description information to obtain the demapped data comprises:

determining, when the data type of the data to be stored is a first preset type, configuration information and storage information in the block description information based on a line speed of the first preset type, and sequentially extracting the data to be stored from the interface data based on the configuration information, the storage information, and the timing relationship in the block description information to obtain the demapped data; and calculating, when the data type of the data to be stored is a third preset type, the number of data containers in the data to be stored based on a data length of the interface data and sending sequence information in the block description information, and demapping the interface data based on the number of the data containers, the timing relationship and the sending sequence information to obtain the demapped data.

13. The method of claim 12, wherein after demapping the interface data based on the block description information to obtain the demapped data, the method further comprises:

writing the demapped data to a storage unit based on a timing relationship in the block description information.

14. The method of claim 12, further comprising:

demapping the interface data, based on at least one of the following, to obtain the demapped data:

a corresponding relationship between Internet Protocol data and a flow identifier in the interface data; and a corresponding relationship between a physical address of a current receiving-end device and the flow identifier in the interface data.

15. A network device, comprising:

one or more processors; and a memory having stored thereon one or more programs which, when executed by the one or more processors, cause the one or more processors to perform the interface data processing method of claim 12.

16. A non-transitory readable storage medium storing a computer program which, when executed by a processor, facilitates to execution of the interface data processing method of claim 12.

* * * * *